F. Smith,
Furniture Caster.
Nº 60,799.   Patented Jan. 1, 1867.

Witnesses:
George H. Andrews
Samuel A. Piper

Inventor:
Francis Smith.
by his attorney
R. H. Eddy

United States Patent Office.

FRANCIS SMITH, OF BOSTON, MASSACHUSETTS, ASSIGNOR TO EDWARD WARD WILDER, OF SAME PLACE.

Letters Patent No. 60,799, dated January 1, 1867.

IMPROVED CASTER FOR FURNITURE.

*The Schedule referred to in these Letters Patent and making part of the same.*

TO ALL PERSONS TO WHOM THESE PRESENTS SHALL COME:

Be it known that I, FRANCIS SMITH, of Boston, in the county of Suffolk, and State of Massachusetts, have invented a new and useful improvement in Casters for Furniture; and I do hereby declare the same to be fully described in the following specification, and represented in the accompanying drawings, of which—

Figure 1:
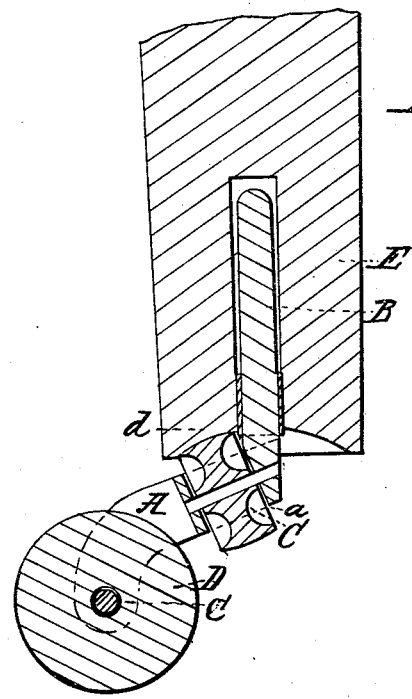

Figure 1 is a vertical section; and

Figure 2:
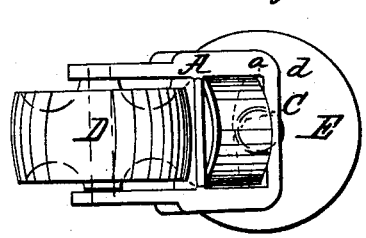

Figure 2, an under side view of a caster provided with my invention.

It is like a common caster, except that it has within its roller-carrier an auxiliary wheel or roller to rest and run against the foot or lower part of the article within which the journal of the caster is inserted and revolves.

In the drawings, A denotes the roller-carrier or frame of the caster; B being the shank or journal, projecting upward from such carrier, and going into a leg, E. Near to the said shank the carrier has a chamber, $a$, made down through it for the reception of an auxiliary wheel or roller, C; the main wheel or roller being represented at D. The wheel C is to revolve freely within the chamber, and on a spindle or axle, $c$, extended across it, as shown in fig. 1. In order for the roller C to operate to the best advantage, the surface $d$, against which it is to run, should be concave, as exhibited in fig. 1. The said wheel is to run against the lower end of the table leg, or article in which the journal is inserted or to be fixed, and it is for the purpose of preventing the usual friction and stoppage of a caster roller-carrier, which generally takes place after a caster may have been for some time in use.

I make no claim to constructing the caster with the auxiliary roller C, nor do I claim the application of a circular bead to the lower surface of the cap with which the caster roller frame operates.

My improved caster is constructed with a shank, B, formed in one piece with the roller-carrier frame A, and arranged at an obtuse angle therewith. Furthermore, the axis of the roller C is arranged at the same angle with the axis of the shank, and both the periphery of the roller and the surface against which it rolls are curved, the latter being a spherical concavity in the foot of the leg A. The roller D is curved on its periphery to fit to such concavity, in manner as shown in fig. 1. There is an advantage in this arrangement in the concavity, and the arrangement and formation of the roller with respect to it, as described, for by such the roller, besides acting as a friction-roller, serves with the concavity to relieve the spindle or shank B, and its socket in the leg F, from lateral strain; the most of the vertical as well as lateral strain on the caster when in use being borne by the roller and the concave surface $d$. This is not the case when the roller is arranged vertically and at right angles to the foot of a table leg, and applied to a bead extending from the lower surface of a cap, as shown in the application of L. G. Case, rejected July 19th, 1854.

What, therefore, I claim as my improvement, is the formation of the lower end of the leg E with the curved concavity $d$, and the formation of the roller C, and its arrangement with respect to such concavity, and the shank B of the roller frame A, substantially as set forth.

FRANCIS SMITH.

Witnesses:
R. H. EDDY,
F. P. HALE, Jr.